(12) United States Patent
Kim et al.

(10) Patent No.: US 7,505,545 B2
(45) Date of Patent: Mar. 17, 2009

(54) METHOD FOR RECOGNIZING STEP MOVEMENT SEQUENCE OF CONTROL ROD DRIVE MECHANISM OF NUCLEAR REACTOR

(75) Inventors: Choon-Kyung Kim, Changwon-si (KR); Seog-Joo Kim, Changwon-si (KR); Jong-Min Cheon, Busan-kwangyuksi (KR); Jong-Moo Lee, Changwon-si (KR); Kook-Hun Kim, Changwon-si (KR); Soon-Man Kwon, Changwon-si (KR)

(73) Assignee: Korea Electro Technology Research Institute, Changwon-si, Kyungsangnam-Do (KR)

( * ) Notice: Subject to any disclaimer, the term of this patent is extended or adjusted under 35 U.S.C. 154(b) by 0 days.

(21) Appl. No.: 10/874,235

(22) Filed: Jun. 24, 2004

(65) Prior Publication Data

US 2005/0286673 A1    Dec. 29, 2005

(51) Int. Cl.
*G21C 7/06* (2006.01)
(52) U.S. Cl. .................. 376/228; 376/219; 376/245; 376/258
(58) Field of Classification Search .............. 376/245, 376/228, 259, 511, 522, 535, 219, 258, 255
See application file for complete search history.

(56) References Cited

U.S. PATENT DOCUMENTS

| | | | | |
|---|---|---|---|---|
| 3,846,771 A | * | 11/1974 | Young et al. | 340/870.31 |
| 4,646,012 A | * | 2/1987 | Feilchenfeld et al. | 324/207.12 |
| 4,714,926 A | * | 12/1987 | Neuner et al. | 340/870.36 |
| 5,006,301 A | * | 4/1991 | Lexa | 376/259 |
| 5,568,528 A | * | 10/1996 | Gaussa et al. | 376/258 |
| 5,602,711 A | * | 2/1997 | Curtis et al. | 361/139 |
| 5,999,583 A | * | 12/1999 | Pysnik et al. | 376/228 |
| 6,421,405 B1 | * | 7/2002 | Ridolfo | 376/259 |
| 6,477,219 B2 | * | 11/2002 | Hirukawa et al. | 376/255 |
| 6,606,367 B2 | * | 8/2003 | Halluin et al. | 376/245 |

* cited by examiner

*Primary Examiner*—Rick Palabrica
(74) *Attorney, Agent, or Firm*—Robert E. Bushnell, Esq.

(57) ABSTRACT

A method for recognizing the step movement sequence of a control rod drive mechanism of a nuclear reactor, which withdraws and inserts a control rod of a nuclear reactor, includes the steps of: measuring current and voltage flowing through an electromagnetic coil used in the control rod drive mechanism of the nuclear reactor; calculating inductance of the coil by using the measured current and voltage; calculating a distance between a rotor and a stator of the control rod drive mechanism on the basis of the calculated inductance; and recognizing the step movement sequence of the control rod drive mechanism on the basis of the calculated distance. This method ensures good reliability in determining the step movement sequence, allows easy implementation using a digital signal processor, and is hardly affected by external factors such as noise.

11 Claims, 5 Drawing Sheets

METHOD FOR RECOGNIZING STEP MOVEMENT SEQUENCE OF CONTROL ROD DRIVE MECHANISM OF NUCLEAR REACTOR

BACKGROUND OF THE INVENTION

1. Technical Field

The present invention relates to a control rod drive mechanism of a nuclear reactor, and more particularly to a method for recognizing the step movement sequence of a control rod drive mechanism of a nuclear reactor which is capable of accurately recognizing the step movement sequence of the control rod drive mechanism, which draws and inserts a control rod of a nuclear reactor, by estimating and calculating a distance between a stator and a rotor.

2. Related Art

A control rod drive mechanism of a nuclear reactor serves to adjust an electric output of a nuclear power plant by drawing and inserting a control rod with the use of an electromagnetic force so as to control the nuclear reaction of the nuclear reactor. The control rod is drawn out and inserted in by a step unit (commonly 5/8 inch), and a series of sequence movements, generally up to 6 or 7 movements, should be accomplished for one step movement. If there is a mechanical or electric problem in any of the sequence movements, the control rod is apt to be stopped or slowed down. This is a very important problem because it relates to the safe operation of the nuclear power plant and to the efficient management of nuclear fuel. Thus, the sequence movements are the most essential factor in the design and implementation of the control rod controlling equipment. Recently, a method for signal-processing a waveform of an electric current flowing through a coil is used in order to determine the movements, but this method is disadvantageously sensitive to noise since it uses a differential operation.

SUMMARY OF THE INVENTION

The present invention is designed while considering such drawbacks of the prior art, and it is an object of the present invention to provide a method for recognizing the step movement sequence of a control rod drive mechanism of a nuclear rod, which method determines whether a rotor is moved by estimating an inductance of an electromagnetic coil from current and voltage flowing through the electromagnetic coil used in the control rod drive mechanism and then calculating the distance between a rotor and a stator, thereby ensuring high reliability while being hardly affected by external factors such as noise.

In order to accomplish the above object, the present invention provides a method for recognizing the step movement sequence of a control rod drive mechanism of a nuclear reactor, which method includes the steps of: measuring current and voltage flowing through an electromagnetic coil used in the control rod drive mechanism of the nuclear reactor; calculating the inductance of the coil by use of the measured current and voltage; and calculating a distance between a rotor and a stator of the control rod drive mechanism on the basis of the calculated inductance, and then recognizing the step movement sequence of the control rod drive mechanism on the basis of the calculated distance.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
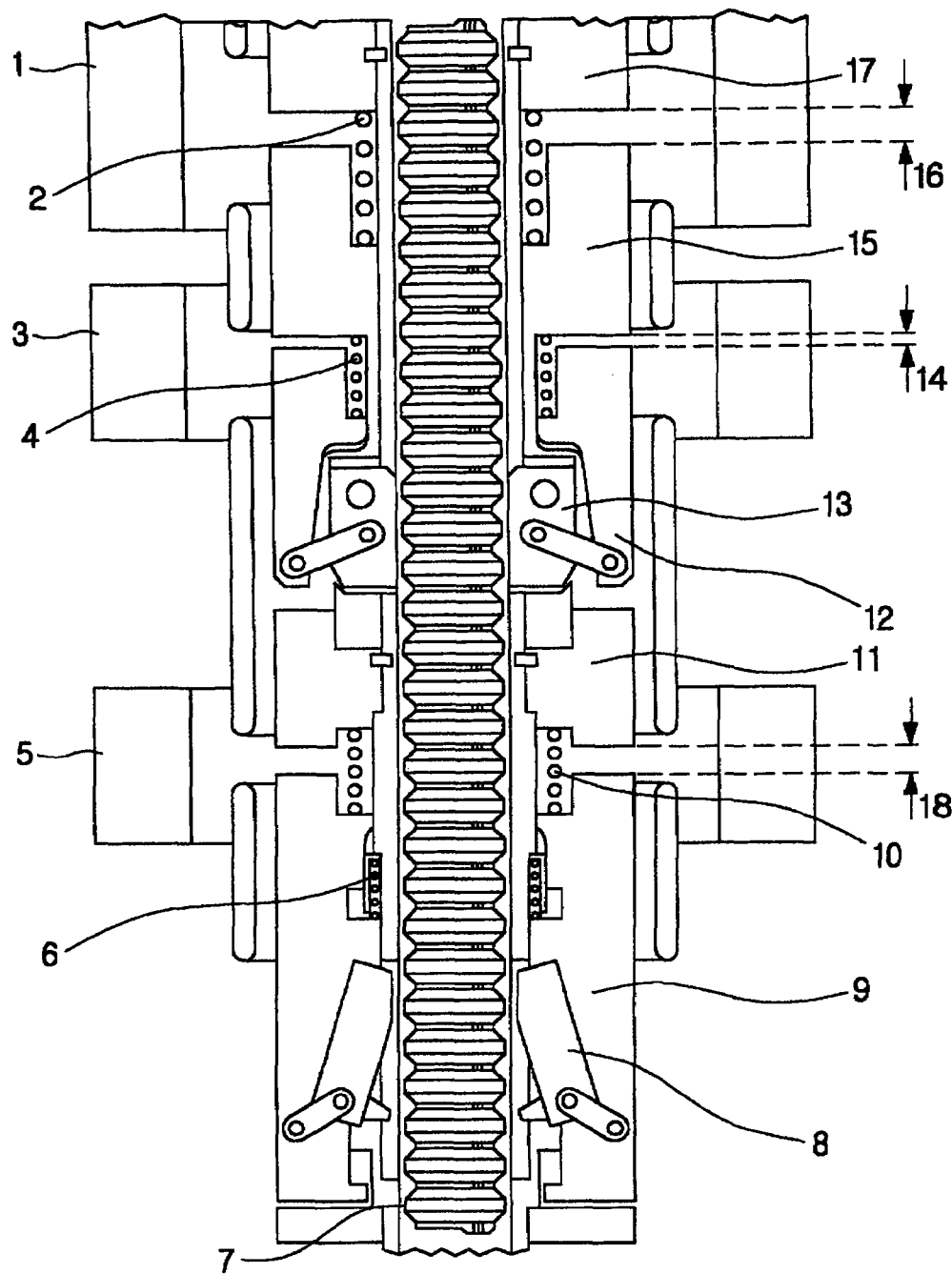
FIG. 1 is a reproduction of FIG. 11 from U.S. Pat. No. 5,076,996 and shows a general control rod drive mechanism of a nuclear reactor.

Hereinafter, the present invention will be described in more detail referring to the drawings.

FIG. 1 is a reproduction of FIG. 11 from U.S. Pat. No. 5,076,996 and shows a control rod drive mechanism to which the method of the present invention is applied. Referring to FIG. 1, the control rod drive mechanism flows an electric current through three coils—a lifting coil 1, a movable gripper coil 3 and a stationary gripper coil 5—according to a predetermined order so that a control rod 7 may be drawn out or inserted in.

A lifting magnetic pole 17 and a lifting armature 15 are closely adhered (or collided) and spaced apart so as to change a gap 16 between them. When the lifting magnetic pole 17 and the lifting armature 15 are closely adhered, the gap 16 is almost zero, so that the lifting movement of the lifting armature 15 is certainly conducted. Gaps 14 and 18 of the movable gripper coil 3 and the stationary gripper coil 5, respectively, are also estimated in the same way, and the movement may also be determined according to the estimation. In FIG. 1, the reference numeral 2 designates a lifting armature return spring, reference numeral 4 designates a movable armature return spring, reference numeral 6 designates a latch return spring, reference numeral 8 designates a stationary gripper, reference numeral 9 designates a stationary gripper armature, reference numeral 10 designates a stationary armature return spring, reference numeral 11 designates a stationary gripper magnetic pole, reference numeral 12 designates a movable gripper armature, reference numeral 13 designates a movable gripper, reference numeral 14 designates a gap between the movable gripper armature 12 and the lifting armature 15, reference numeral 16 designates a gap between the lifting magnetic pole 17 and the lifting armature 15, and reference numeral 18 designates a gap between the stationary gripper magnetic pole 11 and the stationary gripper armature 9, respectively.

Related to the operation of the control rod drive mechanism, a method for recognizing the step movement sequence of the control rod drive mechanism of the nuclear reactor according to the present invention will be described with reference to FIG. 2, which is a block diagram of a digital signal processing board used to implement the method of recognizing the step of movement sequence of a control rod drive mechanism of a nuclear reactor according to the present invention.

First, current and voltage flowing through the electromagnetic coil 35 (FIG. 2) used in the control rod drive mechanism of the nuclear reactor are measured by current measurement unit 36 and voltage measurement unit 37, respectively. After that, the inductance of the coil is calculated by using the measured current and voltage.

In the latter regard, a method for calculating the inductance of the coil is now described in detail.

Figure 3:
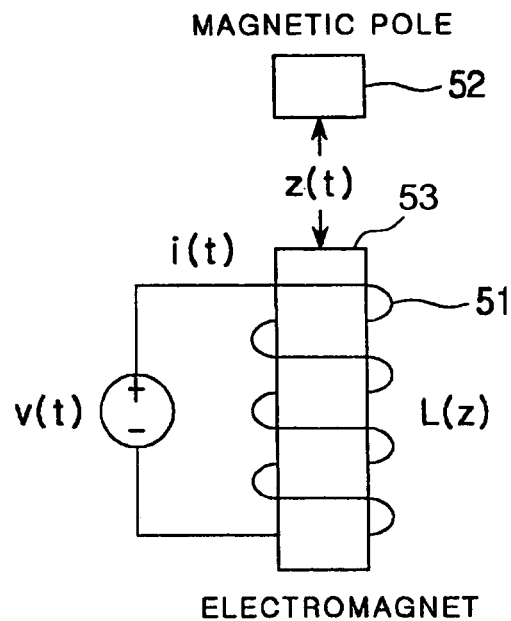
FIG. 3 is a schematic view illustrating the principle of the method of recognizing the step movement sequence of the control rod drive mechanism of the nuclear reactor according to the present invention.

FIG. 3 schematically shows the principle of the present invention. In FIG. 3, if a current (i) is applied to the coil 51 (or a rotor), the armature 53 becomes a magnet, and a distance Z decreases due to the attraction force with respect to a magnetic pole (or a stator) positioned above. This may be expressed in a mathematical equation form as follows.

Equation 1

$$v = \frac{d(L \cdot i)}{dt} + R \cdot i \quad (1)$$

Equation 2

$$L(z) = \frac{k}{z(t)} \quad (2)$$

Equation 1 is a voltage equation according to Kirchhoff's Law, and Equation 2 shows that the inductance of the coil is inversely proportional to the distance between the rotor and the stator, where v is an applied voltage, i is a current flowing through the coil, R is a resistance of the coil, and k is a proportionally constant related to the number of coil turns and the shape of the magnetic pole 52 and armature 53.

Equation 1 may be arranged with regard to the inductance L as follows:

Equation 3

$$L = \frac{1}{i} \int_{t_o}^{t} (v - Ri) dt \quad (3)$$

Equation 3 shows that the inductance of the coil may be calculated on the basis of the voltage applied to the coil and the current flowing through the coil.

Figure 2:
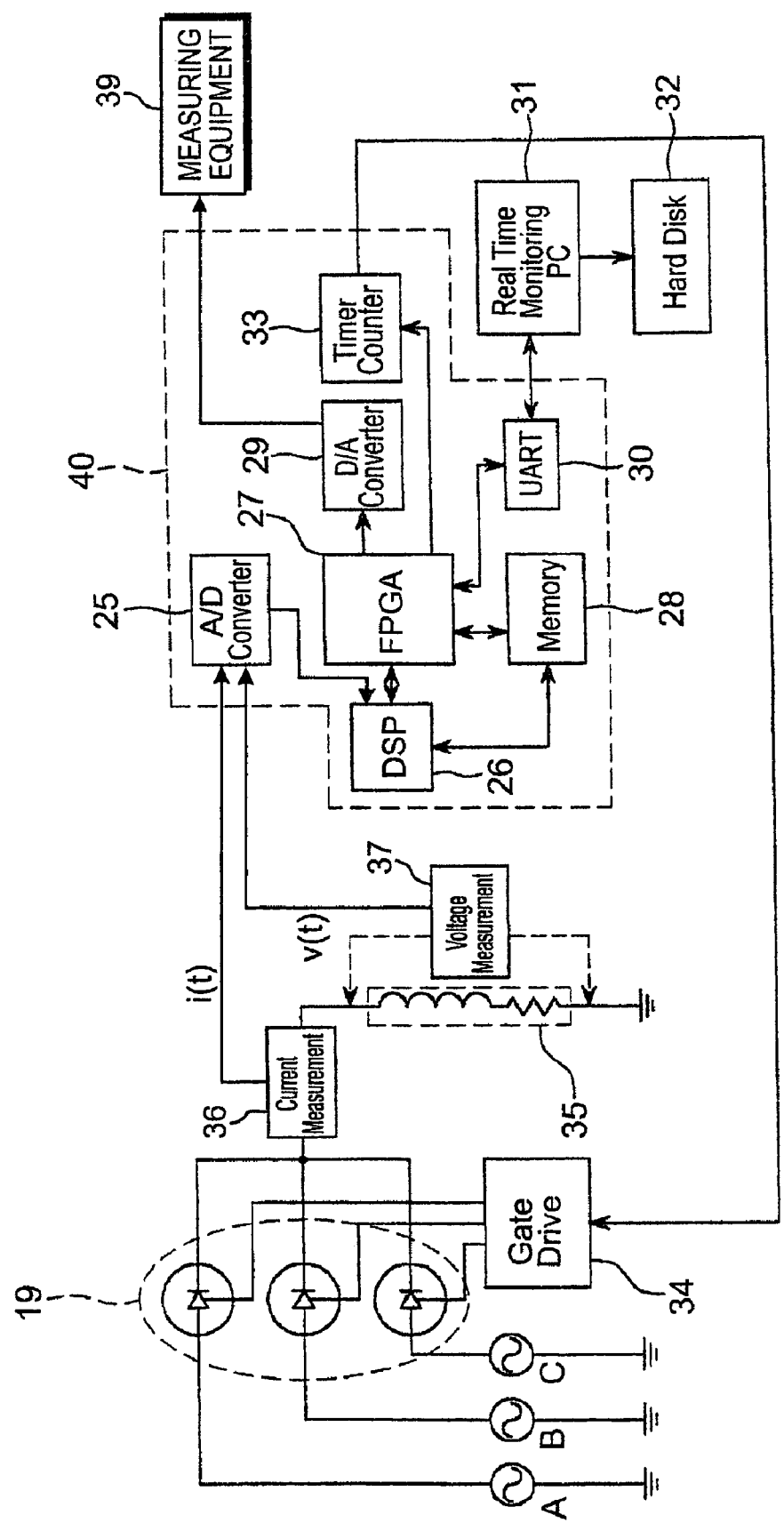
FIG. 2 is a block diagram of a digital signal processing board used to implement the method of recognizing the step movement sequence of a control rod drive mechanism of a nuclear reactor according to the present invention.

FIG. 2 is a block diagram of a digital signal processing board which is used for gap estimation. As schematically shown in FIG. 2, when the control rod drive mechanism is operated by using a three-phase half-wave rectifier 19 to which alternating current (AC) sources A, B and C are connected, a control signal is provided from digital control equipment 40 for the control rod drive mechanism to a thyristor gate drive 34 via a timer counter 33.

The control equipment 40 adopts the step movement sequence recognizing method of the control rod drive mechanism of the nuclear reactor according to the present invention. Control equipment 40 includes an analog-to-digital (A/D) converter 25 for converting analog signals, input by the current measurement unit 36 and the voltage measurement unit 37, into digital signals, a digital signal processor (DSP) 26, a digital logic implementation device (FPGA) 27, a storage device or memory 28, a digital-to-analog (D/A) converter 29 having an output connected to measuring equipment 39 (an oscilloscope or recorder), a serial communication interface or universal asynchronous receiver transmitter (UART) 30, and a timer counter 33. In FIG. 2, reference numeral 31 designates a realtime monitoring device or personal computer (PC) which is capable of storing operational history on a hard disk 32. In FIG. 2, reference numeral 35 designates the electromagnetic coil.

In the digital control equipment 40 for a control rod drive mechanism, data received from the current measurement unit 36 and the voltage measurement unit 37 is converted into a digital signal by the A/D converter 25, and the digital signal processor 26 calculates an inductance L by using the digital values of voltage and current converted by the A/D converter 25 in accordance with Equation 3. Then, a distance Z between the rotor and the stator may be estimated with the use of the calculated inductance L and Equation 2, and the distance Z makes it possible to recognize the step movement sequence of the control rod drive mechanism.

Substantially, the gaps 14, 16 and 18 between three rotors and three stators are respectively closely adhered and spaced apart according to the existence of an applied current when the control rod 7 is driven (see FIG. 1). Thus, by using the aforementioned method of the present invention, by measuring the distance between the rotor and the stator in real time, it can be determined whether the gaps 14, 16 and 18 are relatively small or large, respectively. As a result, it is also possible to easily recognize whether the step movement of the control rod drive mechanism is actually generated.

Equation 3 is numerically very stable since it uses integral calculus. In addition, if a simple filter is applied to an integral term, it is possible to reduce the influence of external noise and residual deflection in a simple way. This method may be very easily implemented using an A/D converter and a microprocessor.

Figure 4:
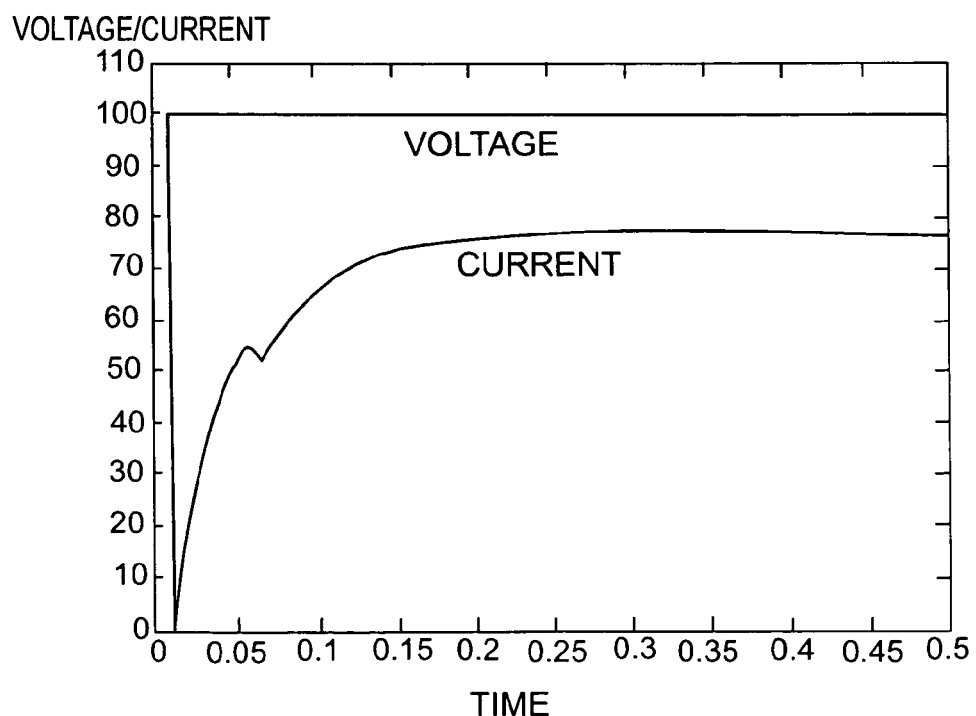
FIG. 4 is a graph showing waveforms of current and voltage of an electromagnetic coil impressed for simulating a gap between a lifting magnetic pole and a lifting armature in the control rod drive mechanism of FIG. 1.
Figure 5:
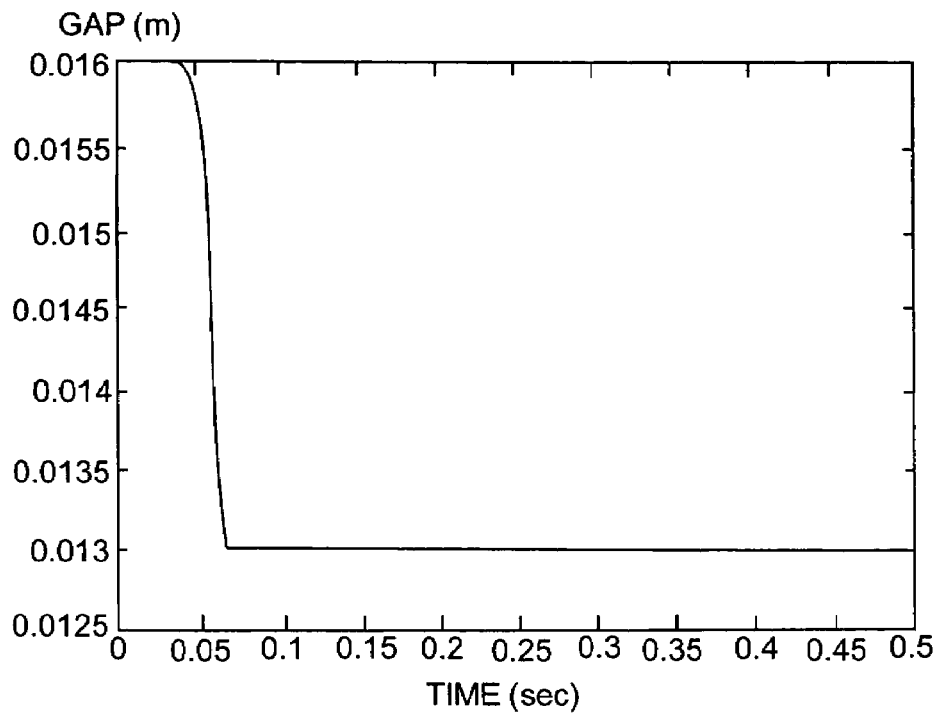
FIG. 5 is a graph showing a gap between an electromagnet and a magnetic pole, which gap is reduced due to the attraction force caused by the current of the coil of FIG. 4.
Figure 6:
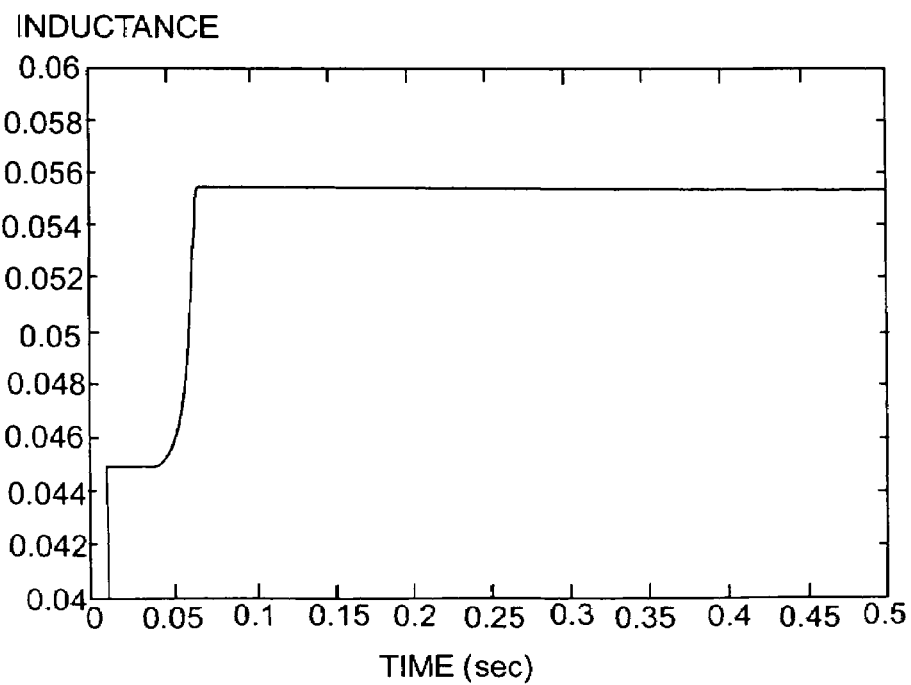
FIG. 6 is a graph showing an inductance L calculated on the basis of voltage and current values of FIG. 4.

FIGS. 4 to 6 show a simulated result for the gap 16 between the lifting magnetic pole 17 and the lifting armature 15 in the control rod drive mechanism of FIG. 1, which uses various constants as shown in Table 1.

TABLE 1

| | | |
|---|---|---|
| Applied voltage | 100 V | |
| Inductance | Maximum gap (16 mm) | 45 mH |
| | Minimum gap (0.1 mm) | 60 mH |
| Resistance | 1.3 Ω | |
| Weight of electromagnet | 130 kg | |

FIG. 4 shows a current flowing through the coil when 100V of voltage is applied to the electromagnetic coil, and FIG. 5 shows a distance (or a gap) between the electromagnet and the magnetic pole, which is reduced due to the attraction force created by the current in the coil. In addition, FIG. 6 shows the inductance L calculated on the basis of the voltage and current at that time.

Figure 7:
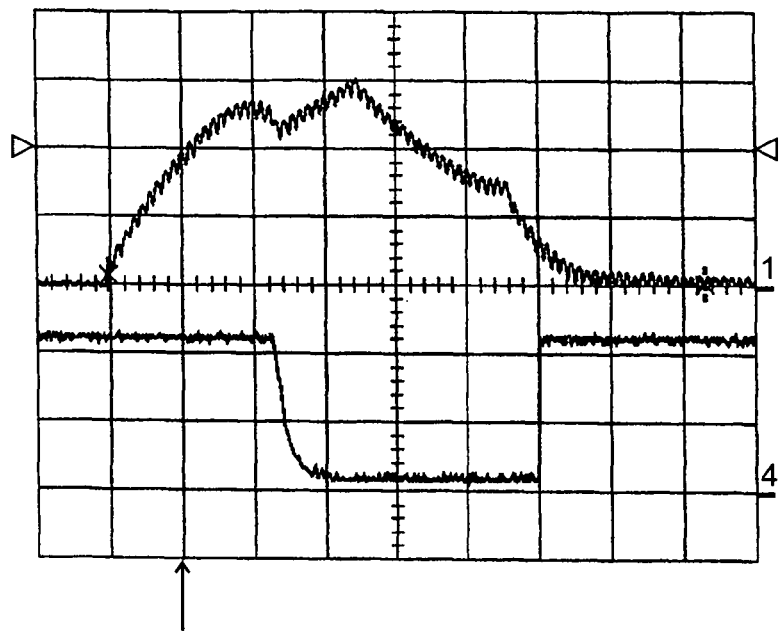
FIG. 7 is a graph showing pore estimation test waveforms when a control rod is drawn into the lifting coil of a mimic control rod drive mechanism.
Figure 8:
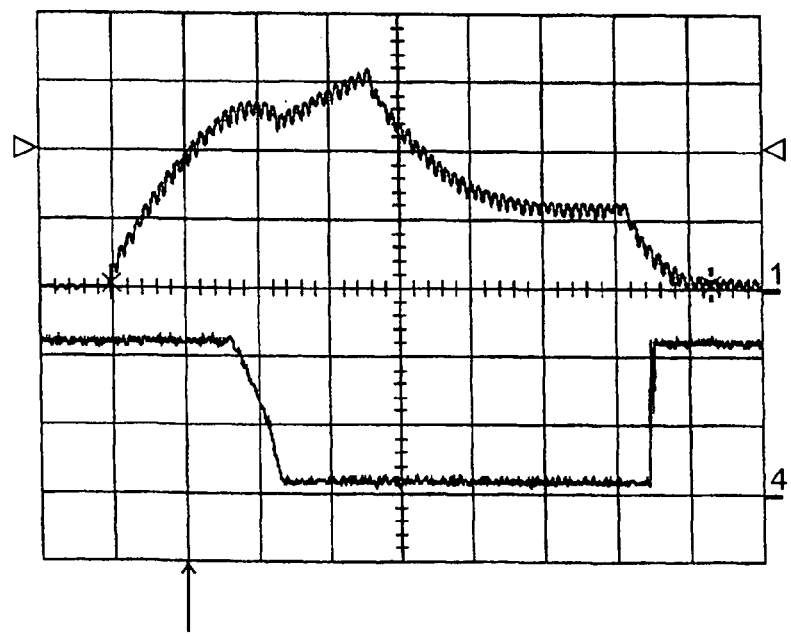
FIG. 8 is a graph showing pore estimation test waveforms when a control rod is inserted into the lifting coil of the mimic control rod drive mechanism.

FIGS. 7 and 8 are graphs of waveforms which result from the gap estimation test at the lifting coil of a simulated control rod drive mechanism by using the digital signal processor of FIG. 2. FIGS. 7 and 8 show estimated results of the gap 16 between the lifting magnetic pole 17 and the lifting armature 15 of FIG. 1. In FIGS. 7 and 8, the upper waveform denotes a coil current, and the lower waveform denotes an estimated gap (16 mm, 0 mm, 16 mm), respectively. In addition, FIG. 7 relates to the case wherein the control rod is drawn out, and FIG. 8 relates to the case wherein the control rod is inserted.

As described above, the method for recognizing the step movement sequence of a control rod drive mechanism of a nuclear reactor according to the present invention determines whether a rotor is moved by estimating an inductance of the coil from the current and voltage of the electromagnetic coil, and then calculating a distance between the rotor and the stator on the basis of the estimated inductance. Thus, the present invention ensures good reliability for determination, allows easy implementation using a digital signal processor, and is hardly affected by external factors such as noise.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. An apparatus for recognizing a step movement sequence of a control rod drive mechanism of a nuclear reactor, said apparatus comprising:
    measuring means connected to an electromagnetic coil used in the control rod drive mechanism of the nuclear reactor for measuring current flowing through and voltage across the electromagnetic coil used in the control rod drive mechanism of the nuclear reactor; and
    a digital signal processor connected to said measuring means;
    wherein said digital signal processor comprises:
        first calculating means for calculating an inductance of the electromagnetic coil using the measured current and voltage;
        second calculating means for calculating a distance between a rotor and a stator of the control rod drive mechanism on the basis of the calculated inductance; and
        determining means for determining the step movement sequence of the control rod drive mechanism on the basis of the calculated distance; and
    wherein said measuring means comprises a current measurement unit and a voltage measurement unit connected to the control rod drive mechanism.

2. The apparatus of claim 1, wherein said first calculating means calculates the inductance of the electromagnetic coil in accordance with the following equation:

$$L = \frac{1}{i}\int_{t_o}^{t}(v - Ri)dt$$

where L is inductance, v is applied voltage, R is coil resistance, i is current flowing through the coil, $t_o$ is initial time, and t is current time.

3. The apparatus of claim 2, wherein said second calculating means calculates the distance between the rotor and the stator in accordance with the following equation:

$$L(z) = \frac{k}{z(t)}$$

where L(z) is inductance as a function of distance z, z(t) is the distance between the rotor and the stator as a function of time, and k is a proportionality constant related to a number of coil turns of the rotor and a shape of the rotor and the stator.

4. The apparatus of claim 1, wherein said second calculating means calculates the distance between the rotor and the stator in accordance with the following equation:

$$L(z) = \frac{k}{z(t)}$$

where L(z) is inductance as a function of distance z, z(t) is the distance between the rotor and the stator as a function of time, and k is a proportionality constant related to a number of coil turns of the rotor and a shape of the rotor and the stator.

5. The apparatus of claim 1, wherein said measuring means comprises an analog-to-digital (A/D) converter connected to the current measurement unit and the voltage measurement unit for converting the measured current and voltage into digital signals.

6. The apparatus of claim 5, wherein said digital signal processor is connected to the analog-to-digital (A/D) converter.

7. The apparatus of claim 6, further comprising a digital logic implementation device connected to an output of said digital signal processor.

8. The apparatus of claim 7, further comprising a memory connected to said digital logic implementation device and to said digital signal processor.

9. The apparatus of claim 8, further comprising a serial communications interface device connected to an output of said digital logic implementation device.

10. The apparatus of claim 9, further comprising a real time monitoring device connected to said serial communications interface device, and having an output connected to a hard disk.

11. The apparatus of claim 7, further comprising a timer counter having an input connected to an output of said digital logic implementation device, and having an output connected to an input of a thyristor gate drive connected to a plurality of thyristor gates.

* * * * *